United States Patent [19]

Huang

[11] Patent Number: 4,715,222

[45] Date of Patent: Dec. 29, 1987

[54] PRESSURE GAUGE

[76] Inventor: Tien-Tsai Huang, No. 4, Lane 30, Wu Chuan Street, Panchiao City, Taiwan

[21] Appl. No.: 938,886

[22] Filed: Dec. 8, 1986

[51] Int. Cl.$^4$ .................. B60C 23/02; G01L 7/16
[52] U.S. Cl. ............................ 73/146.8; 73/709; 73/744
[58] Field of Search ............ 73/146.8, 744, 709, 73/146.3; 116/266, 271

[56] References Cited

U.S. PATENT DOCUMENTS 1,405,706  2/1922  Bentley ........................ 73/146.8

FOREIGN PATENT DOCUMENTS 0858137 12/1952  Fed. Rep. of Germany ........ 73/709
0879022  6/1953  Fed. Rep. of Germany ........ 73/709
0267098 12/1927  United Kingdom ................ 73/709
1024765  6/1983  U.S.S.R. ........................ 73/146.8

Primary Examiner—Donald O. Woodiel
Attorney, Agent, or Firm—Bacon & Thomas

[57] ABSTRACT

A pressure gauge includes a housing, an indicating board, a rotatable axle with a pinion member, an indicator for displaying the degree of rotation of the axle, a tube member disposed on the housing and having an air inlet, a movable member sealingly disposed in the tube member near the air inlet for being forced by the external air pressure to move, a compression spring for biasing the movable member toward the air inlet, a rack member movably mounted in the tube member and capable of extending outwardly of the tube member in the housing to mesh with the pinion member so as to drive the axle to rotate, a tension spring for pulling the rack member toward the movable member, a blocking member normally brought into engagement with the surface of the axle to create a friction force therebetween when the axle is driven to rotate by the rack member as the movable member is forced downwardly by the air pressure, wherein the friction force is adjusted higher than tension force of the tension spring when the tension spring is at its most tensed state; thereby, only when the blocking member is released from the axle, will the rack member be pulled by the tension spring to its original position.

5 Claims, 6 Drawing Figures

PRESSURE GAUGE

BACKGROUND OF THE INVENTION

The invention relates to an accurate pressure gauge with a simple structure which is easy to manufacture and assemble.

In order for convenience and practicality in use, watch-like pressure gauges are the most common. Referring to FIGS. 1 and 2A through 2C, a common watch-like pressure gauge icludes a housing 1, including a tube portion 101 longitudinally formed on the upper end thereof and having an inward flange 1011 at the lower end of the tube portion 101, a right support rod A fixed on the right of the housing 1 and including a first tongue at the end thereof, a left support rod B fixed on the left of the housing 1 and including a second tongue at the end therof, a bearing 102 fixed on the center of the housing 1, and a pivot pin 103 fixed on the housing below the left support rod B; a tube member 2, connected insertably to the upper end of the tube portion 101, including a flexible upper end portion with an air inlet 201; a seal member 3 of rubber material, movably disposed in the tube member 2 near the air inlet 201; a push rod 4, disposed in the space defined collectively by the tube portion 101 and the tube member 2, extending outwardly of the tube portion 101 at the lower end of the push rod 4, having an outward flange 41 at the upper end of the push rod 4 for abutting on the under surface of the seal member 3; a compression spring 5 disposed in the tube portion 101 and the tube member 2 for biasing the seal member 3 against the pressure exerted on the seal member 3; a sector member 6, pivotally mounted on the right support rod A, including an upper radius, a lower radius, a toothed arc 61 engaging with the pinion member 81, and a blocking plate 62 projecting from the lower radius for blocking the lower end of the push rod 4; a first torsion spring 7, pivotally mounted on the right support rod A for biasing the sector member 6 to rotate anticlockwise; an axle 8, journalled on the bearing 102, including a pinion member 81 fixedly mounted on the axle 8; a support sheet C having two circular holes at the opposite ends thereof for sleeving on the tongues of the support rods A and B, and a first central hole for having inserted therethrough the axle 8; an indicating needle 9, secured to the end of the axle 8; an indicating board 10, having a second central hole for having inserted therethrough the axle 8 to be located between the support sheet C and the indicating needle 10, and a blocking rod 1001 mounted on the indicating board 9 at an end of the indicating mark for preventing the indicating needle 9 from undesired directional rotation; a second torsion spring 11, pivotally mounted on the pivot pin 103 and extending around a portion of the axle 8 for gripping the axle 8 to prevent the axle from rotation; and a push button 12, fixed on the housing 1 and connectd to the free end of the second torsion spring 11 for pushing thefree end of the second torsion spring 11 to release the second torsion sprig 11 from the axle 8. The gripping force of the second torsion spring 11 against the axle 8 is larger than the bias force of the first torsion spring 7 against the sector member 6.

In use, referring to FIG. 2A, when the air inlet 201 initiates communication with the inside of an article, such as a tire, the seal member 3 will be exerted by the air pressure inside of the article to push the push rod 4 downwardly, thereby pushing the blocking plate 62 and hence the sector member 6 to rotate anticlockwise. By the engagement of the toothed arc 61 and the pinion member 81, the axle 8 is driven to rotate clockwise so that the indicating needle 9 indicates the value of the air pressure. After the article disengages from the air inlet 201, referring to FIG. 2B, the tension spring 5 will bias the push rod 4 and hence the seal member 3 to restore the original position. On the other hand, due to the gripping of the second torsion spring 11 against the axle 8, the first torsion spring 7 fails to bias the sector member 6 to move up so that the indicating needle 9 remains fixed. This enables the pressure gauge to be held conveniently before the eyes of the user. Subsequently, when the value of the pressure is known, the push button 12 is actuated to release the axle 8 from being gripped by the second torsion spring 11 so as to permit the first torsion spring 7 to bias the sector member 6 to move up, thereby permitting the indicating needle 9 to be restored to the initial position.

In the conventional pressure gauge, every tooth of the arc of the sector member 6 is very small, so relatively high accuracy is necessary during manufacture. Additionally, dust on the small teeth of the arc easily causes undesired errors in measurement.

SUMMARY OF THE INVENTION

It is therefore an object of the invention to provide an accurate pressure gauge which is easily manufactured.

According to the invention, a pressure gauge for measuring the pressure inside of a tire comprising: a housing having an indicating board on one side thereof; an axle rotatably mounted in the housing; a pinion member fixedly mounted on the axle; an indicator for displaying the degree of rotation of the axle; a tube member including an inner end extending inwardly of the housing and in vertical position relative to the axis of the axle, and an outer end extending outwardly of the housing, adapted to communicate with the inside of the tire; a movable member sealingly disposed in the outer end of the tube member for being forced by the air pressure inside of the tire; a compression spring, disposed in the tube member, biasing the movable member against the pressure exerted on the movable member; a rack member disposed movably in the tube member and having a lower end extending outwardly of the tube member so as to mesh with the pinion member; a tension spring connecting the movable member with the rack member; a blocking member normally brought into engagement with the surface of the axle to create a friction force therebetween when the axle is driven to rotate by the rack member as the movable member is forced downwardly by the air pressure, wherein the friction force is adjusted higher than the tension force of the tension spring when the tension spring is at its most tensed state; thereby, only when the blocking member is released from the axle, will the rack member be pulled by the tension spring to its original position.

DETAILED DESCRIPTION OF THE PREFERRED EMBODIMENT

Figure 1:
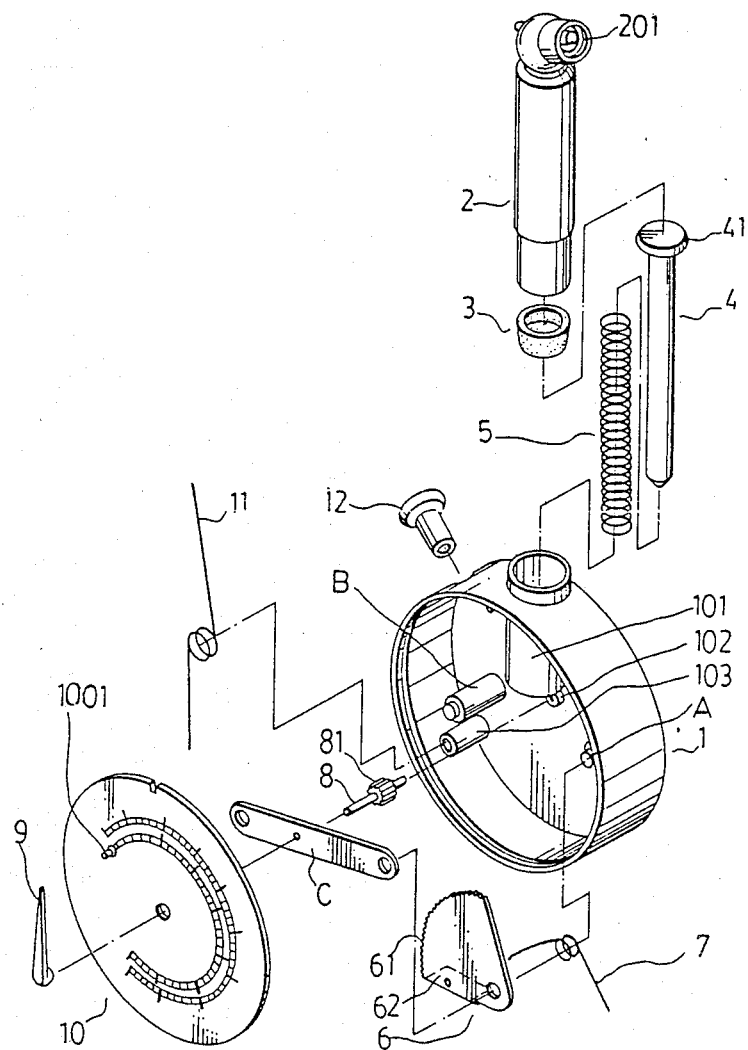
FIG. 1 is an exploded view of a pressure gauge according to prior art.
Figure 2A:
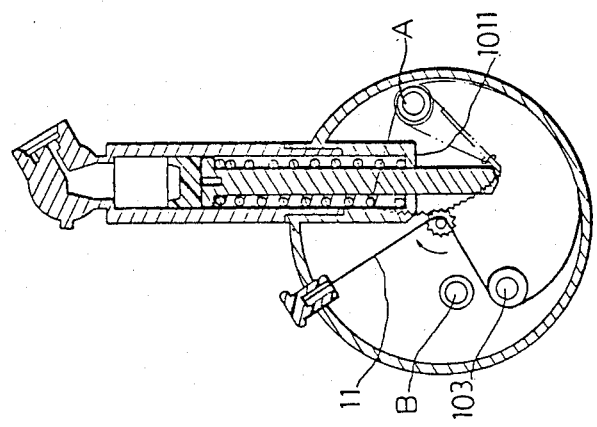
FIG. 2A is a sectional view of the pressure gauge of FIG. 1 during measurement.
Figure 2B:
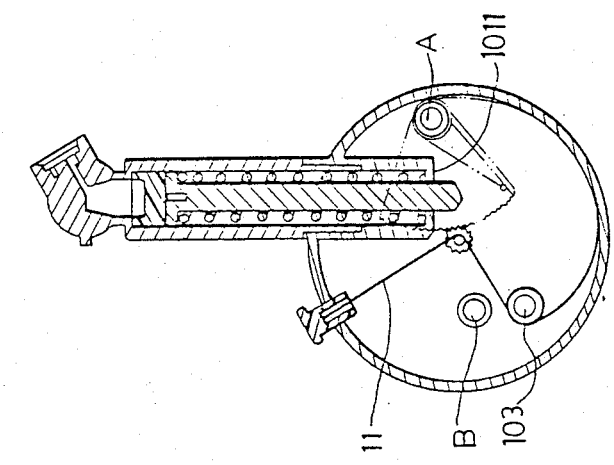
FIG. 2B is a sectional view of the pressure gauge of FIG. 1 in a state that a push button has not yet been pushed after measurement.
Figure 2C:
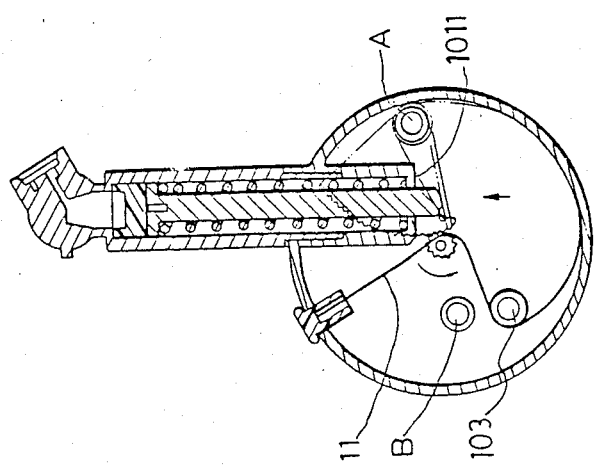
FIG. 2C is a sectional view of the pressure gauge of FIG. 1 in a state that the push button has been pushed after measurement.
Figure 3:
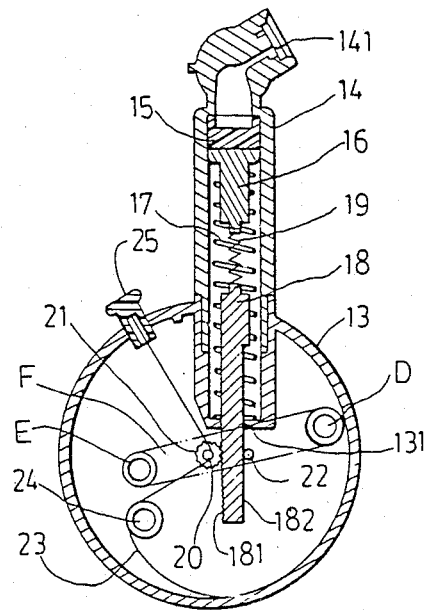
FIG. 3 is a sectional view of a pressure gauge according to the invention.

Referring to FIG. 3, there is shown a pressure gauge according to the invention. It includes a housing 13, a tube member 14 wth an air inlet 141, a seal member 15, an abutting member 16 abutting on the seal member 15, a compression spring 17 for biasing the abutting member 16 and hence the seal member 15 toward the air inlet 141, a rack member 18, a tension spring 19 connected between the abutting member 16 and the rack member 18 for pulling the rack member 18 toward the abutting member 16, an rotatable axle 20, a pinion member 21 fixedly mounted on the axle 20, a post 22 fixedly mounted on the housing 13 for incorporating with the pinion member 21 to restrict the rack member 18 to pass therebetween, a pair of support rods D and E, a support sheet F, a torsion spring 23, a pivot pin 24 for mounting the torsion spring 23 thereon, and a push button 25 connected to the free end of the torsion spring 23.

As illustrated, the housing 13, tube member 14, seal member 15, compression spring 17, axle 20, pinion member 21, torsion spring 23, pivot pin 24, push button 25, support rods D and E, and support sheet F are similar to those of the conventional pressure gauge in construction, so further description will be omitted.

Figure 4:
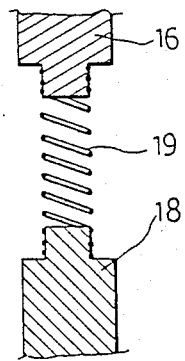
FIG. 4 is a sectional view illustrating the connection between the movable member and the rack member by means of a tension spring in the pressure gauge of FIG. 3.

The pressure gauge of FIG. 3 improves over the above conventional pressure gauge in the abutting member 16, rack member 18, tension spring 19, and post 22. On the lower portion of the rack member 18 is provided a threaded portion 181 which has a planar contacting surface 182 on the side thereof opposite the post 22. Also, on the lower end portion of the abutting member 16 and the upper end portion of the rack member 18 are respectively provided threaded portions (see FIG. 4) so that the tension spring 19 sleeves fixedly thereon. Furthermore, the inward flange of the tube portion of the housing 13 is preferably provided with a straight inner edge 131 opposite the planar contacting surface 182 so as to obtain stable movement of the rack member 18. Thus, the pressure gauge according to the invention is easier than the above conventional pressure gauge in manufacture and assembly. The engaging teeth of the rack member 18 with the pinion member 21 are relatively large, so that dust in the threaded portion 181 fails to affect the accuracy of the pressure gauge.

In use, the abutting member 16 moves synchronously with the seal member 15 to push the rack member 18 while engaged with an article to be measured so as to drive the axle 20 to rotate clockwise through the threaded portion 181 of the rack member 18 and the pinion member 21, thereby indicating the value of the air pressure. When the air inlet 141 of the pressure gauge disengages from the article, the abutting member 16 and hence the seal member 15 are biased by the compression spring 17 to the original position. During upward movement of the abutting member 16 and the seal member 15, since the axle 20 is gripped by the torsion spring 23, the rack member 18 is fixed so that the tension spring 19 is tensed. By actuating the push button 25, the rack member 18 will be pulled by the tension spring 19 to move up. This allows the indicated value of the air pressure to be fixed until the push button 25 is actuated.

With the invention thus explained, it is apparent that various modifications and variations can be made without departing from the scope of the invention. It is therefore intended that the invention be limited as indicated in the appended claims.

What is claimed is:

1. A pressure gauge for measuring the pressure inside of a tire comprising:
   a housing having an indicating board on one side thereof;
   an axle rotatably mounted in said housing;
   a pinion member fixedly mounted on said axle;
   an indicator for displaying the degree of rotation of said axle;
   a tube member including an inner end extending inwardly of said housing and in vertical position relative to the axis of said axle, and an outer end extending outwardly of said housing, adapted to communicate with the inside of the tire;
   a movable member sealingly disposed in the outer end of said tube member for being forced by the air pressure inside of the tire;
   a compression spring disposed in said tube member, biasing said movable member against the pressure exerted on said movable member;
   a rack member disposed movably in said tube member and having alower end extending outwardly of said tube member so as to mesh with said pinion member;
   a tension spring connecting said movable member with said rack member;
   a blocking member normally brought into engagement with the surface of said axle to create a friction force therebetween when said axle is driven to rotate by said rack member as said movable member is forced downwardly by the air pressure, wherein the friction force is adjusted higher than tension force of said tension spring when said tension spring is at its most tensed state; thereby, only when said blocking member is released from said axle, will said rack member be pulled by the tension spring to its original position.

2. A pressure gauge as claimed in claim 1, further comprising a guide device for guiding said rack member to move so as to maintain the mesh between said rack member and said pinion member.

3. A pressure gauge as claimed in claim 2, wherein said guide device comprises:
   a post fixed on said housing near said axle for restricting said rack member to move therebetween; and
   a planar contacting surface of said rack member provided on a side of said rack member opposite said post for stably contacting said post.

4. A pressure gauge as claimed in claim 1, wherein said blocking member is a torsion spring extending around a portion of said surface of said axle for gripping said axle.

5. A pressure gauge as claimed in claim 4, wherein said torsion spring has a free end capable of being pushed to release said torsion spring from said axle.

* * * * *